US012723154B2

(12) United States Patent
Kobayashi et al.

(10) Patent No.: US 12,723,154 B2
(45) Date of Patent: Sep. 1, 2026

(54) DOWNHOLE TOOL OR MEMBER THEREOF CONTAINING POLYGLYCOLIC ACID

(71) Applicant: Kureha Corporation, Tokyo (JP)

(72) Inventors: Takuma Kobayashi, Tokyo (JP); Takahiro Suga, Tokyo (JP)

(73) Assignee: KUREHA CORPORATION, Tokyo (JP)

( * ) Notice: Subject to any disclaimer, the term of this patent is extended or adjusted under 35 U.S.C. 154(b) by 0 days.

(21) Appl. No.: 18/693,754

(22) PCT Filed: Sep. 14, 2022

(86) PCT No.: PCT/JP2022/034307
§ 371 (c)(1),
(2) Date: Mar. 20, 2024

(87) PCT Pub. No.: WO2023/053955
PCT Pub. Date: Apr. 6, 2023

(65) Prior Publication Data

US 2024/0392128 A1 Nov. 28, 2024

(30) Foreign Application Priority Data

Sep. 29, 2021 (JP) ................................ 2021-159575

(51) Int. Cl.
*E21B 33/12* (2006.01)
*C08K 5/3442* (2006.01)
*C08L 67/04* (2006.01)

(52) U.S. Cl.
CPC ............ *C08L 67/04* (2013.01); *C08K 5/3442* (2013.01); *E21B 33/1208* (2013.01); *C08L 2201/08* (2013.01); *C08L 2205/025* (2013.01); *E21B 2200/08* (2020.05)

(58) Field of Classification Search
CPC ................. C08L 67/04; C08L 2201/08; C08L 2205/025; C08K 5/3442; E21B 33/1208; E21B 2200/08
See application file for complete search history.

(56) References Cited

U.S. PATENT DOCUMENTS

| | | | |
|---|---|---|---|
| 9,127,627 | B2 | 9/2015 | Frazier |
| 9,267,351 | B2 | 2/2016 | Okura et al. |
| 9,932,796 | B2 | 4/2018 | Walton et al. |
| 10,655,041 | B2 | 5/2020 | Usova et al. |
| 2009/0318628 | A1 | 12/2009 | Tanaka et al. |
| 2010/0063219 | A1 | 3/2010 | Sato et al. |
| 2011/0190456 | A1 | 8/2011 | Itoh et al. |
| 2011/0224385 | A1 | 9/2011 | Shoji et al. |
| 2011/0237755 | A1 | 9/2011 | Shoji et al. |
| 2011/0251384 | A1 | 10/2011 | Shoji et al. |
| 2013/0079450 | A1 | 3/2013 | Sato et al. |
| 2013/0240201 | A1 | 9/2013 | Frazier |
| 2014/0377555 | A1 | 12/2014 | Saigusa |
| 2015/0051119 | A1 | 2/2015 | Masaki et al. |
| 2015/0096741 | A1 | 4/2015 | Okura et al. |
| 2015/0105521 | A1* | 4/2015 | Shoji ...................... C08L 67/04 525/437 |
| 2015/0361326 | A1* | 12/2015 | Masaki ................. C09K 8/588 507/219 |
| 2015/0376373 | A1 | 12/2015 | Shoji et al. |
| 2016/0108696 | A1 | 4/2016 | Okura et al. |
| 2016/0145483 | A1 | 5/2016 | Lecerf et al. |
| 2016/0289374 | A1 | 10/2016 | Saito et al. |
| 2016/0298017 | A1* | 10/2016 | Takahashi .............. E21B 43/26 |
| 2017/0016298 | A1* | 1/2017 | Takahashi .............. E21B 29/02 |
| 2017/0175481 | A1 | 6/2017 | Kobayashi et al. |
| 2017/0284169 | A1 | 10/2017 | Waton et al. |
| 2017/0342306 | A1 | 11/2017 | Usova et al. |
| 2017/0369708 | A1 | 12/2017 | Kokel et al. |
| 2020/0149368 | A1* | 5/2020 | Yoshida ................. E21B 23/06 |
| 2020/0207949 | A1 | 7/2020 | Kobayashi et al. |

FOREIGN PATENT DOCUMENTS

| | | | |
|---|---|---|---|
| CN | 101589108 | A | 11/2009 |
| CN | 102171289 | A | 8/2011 |
| CN | 102245679 | A | 11/2011 |
| CN | 111051643 | A | 4/2020 |
| CN | 211038596 | U | 7/2020 |

(Continued)

OTHER PUBLICATIONS

International Preliminary Report on Patentability and English translation of the Written Opinion of the International Searching Authority for International Application No. PCT/JP2022/034307, dated Apr. 11, 2024.
Extended European Search Report for European Application No. 22875826.4, dated Dec. 3, 2024.
Chinese Office Action for Chinese Application No. 202180061677.4, dated Oct. 16, 2025, with English translation.
Canadian Office Action for Canadian Application No. 3,195,157, dated Jul. 23, 2024.
Chinese Office Action and Search Report for Chinese Application No. 202180061677.4, dated Apr. 1, 2025, with English translation.
English Translation of International Preliminary Report on Patentability and Written Opinion mailed Apr. 20, 2023, in PCT/JP2021/037498.
Extended European Search Report for European Application No. 21877783.7, dated Feb. 12, 2024.
U.S. Notice of Allowance for U.S. Appl. No. 18/247,816, dated May 8, 2024.
European Communication pursuant to Article 94(3) EPC for European Application No. 21 877 783.7, dated Dec. 22, 2025.
Chinese Office Action and Search Report for Chinese Application No. 202180061677.4, dated Aug. 13, 2025, with English translation.

*Primary Examiner* — Silvana C Runyan
(74) *Attorney, Agent, or Firm* — Birch, Stewart, Kolasch & Birch, LLP

(57) ABSTRACT

This technique is capable of suppressing reduction in thickness of a downhole tool or a component thereof in a well at a high temperature. The downhole tool or a component has a resin composition including: 50 parts by mass or more and 97 parts by mass or less of polyglycolic acid; 3 parts by mass or more and 50 parts by mass or less of polybutylene terephthalate; and 2 parts by mass or more and 15 parts by mass or less of a cyclic carbodiimide compound with respect to 100 parts by mass of a total amount of the polyglycolic acid and the polybutylene terephthalate.

12 Claims, 5 Drawing Sheets

(56) References Cited

FOREIGN PATENT DOCUMENTS

| | | | |
|---|---|---|---|
| CN | 111690391 | A | 9/2020 |
| JP | 2011-143709 | A | 7/2011 |
| JP | 2012-1594 | A | 1/2012 |
| JP | 2012-11776 | A | 1/2012 |
| JP | 2012-149208 | A | 8/2012 |
| JP | 2015-160872 | A | 9/2015 |
| JP | 2015-172116 | A | 10/2015 |
| JP | 2017-200985 | A | 11/2017 |
| WO | WO 2010/071213 | A1 | 6/2010 |
| WO | WO 2011/152199 | A1 | 12/2011 |
| WO | WO 2013/183363 | A1 | 12/2013 |
| WO | WO 2015/072317 | A1 | 5/2015 |
| WO | WO 2015/199647 | A1 | 12/2015 |
| WO | WO 2016/007260 | A1 | 1/2016 |

* cited by examiner

[FIG. 1]
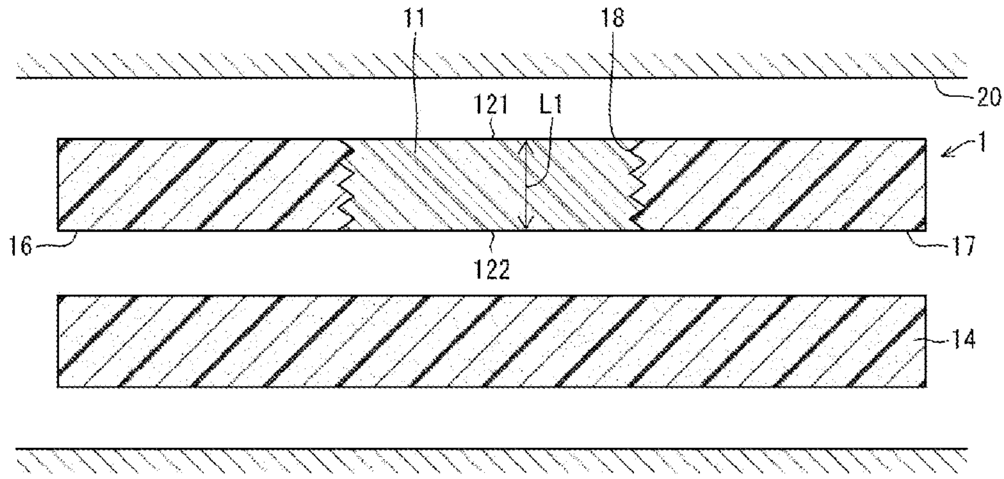
[FIG. 2]
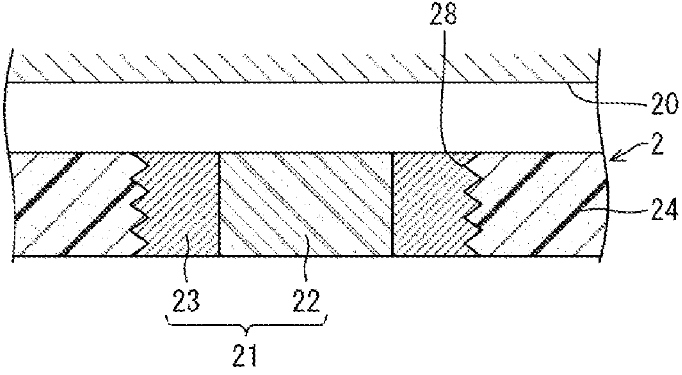
[FIG. 3]
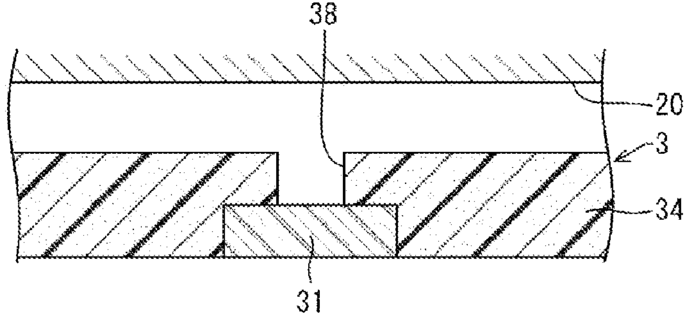

[FIG. 4]
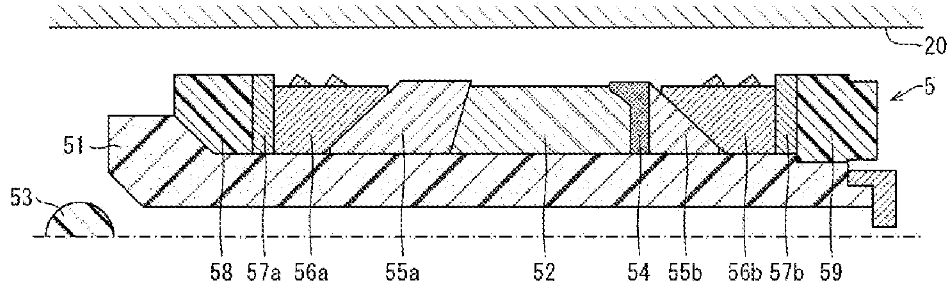
[FIG. 5]
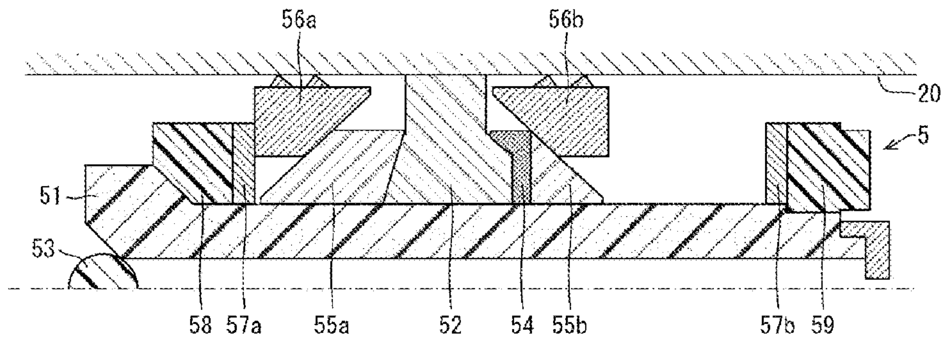
[FIG. 6]
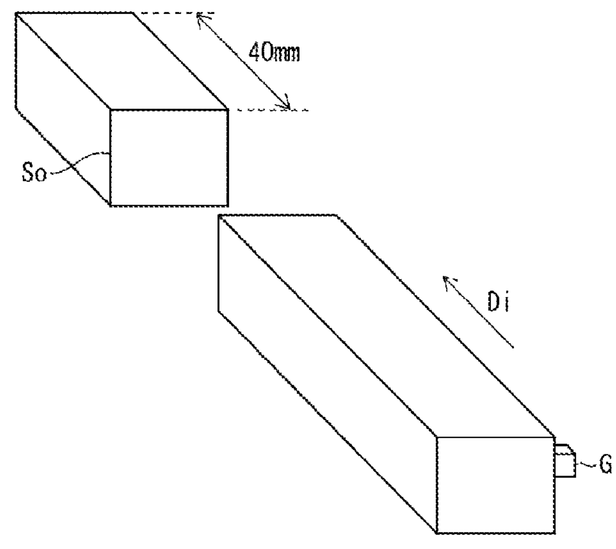

[FIG. 7]
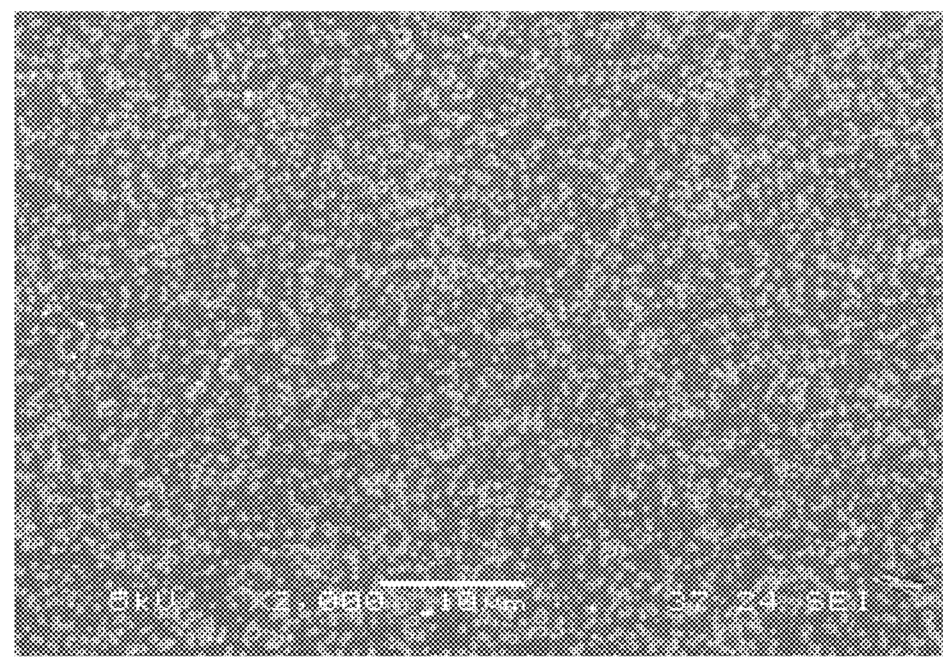
[FIG. 8]
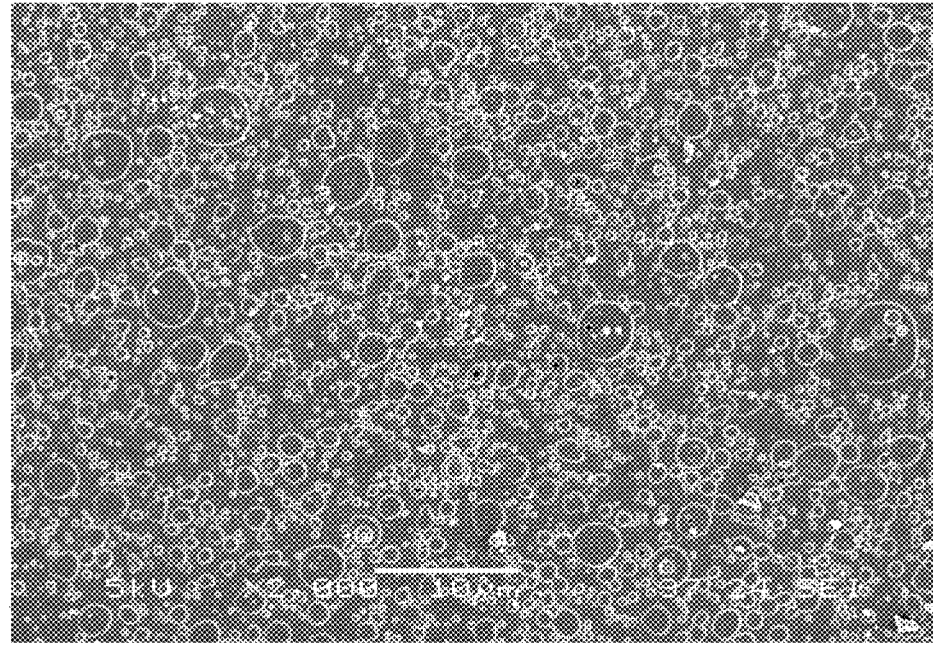

[FIG. 9]
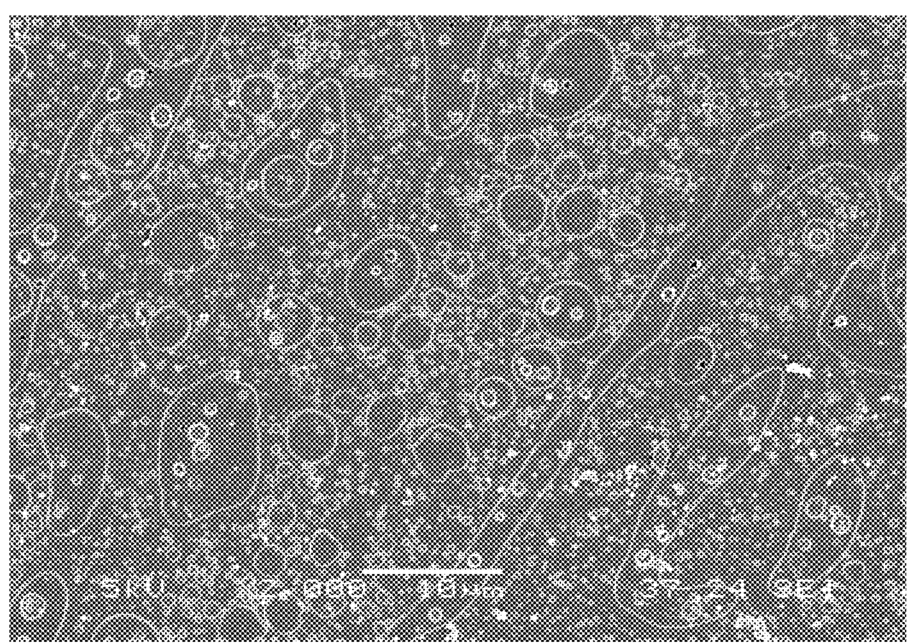
[FIG. 10]
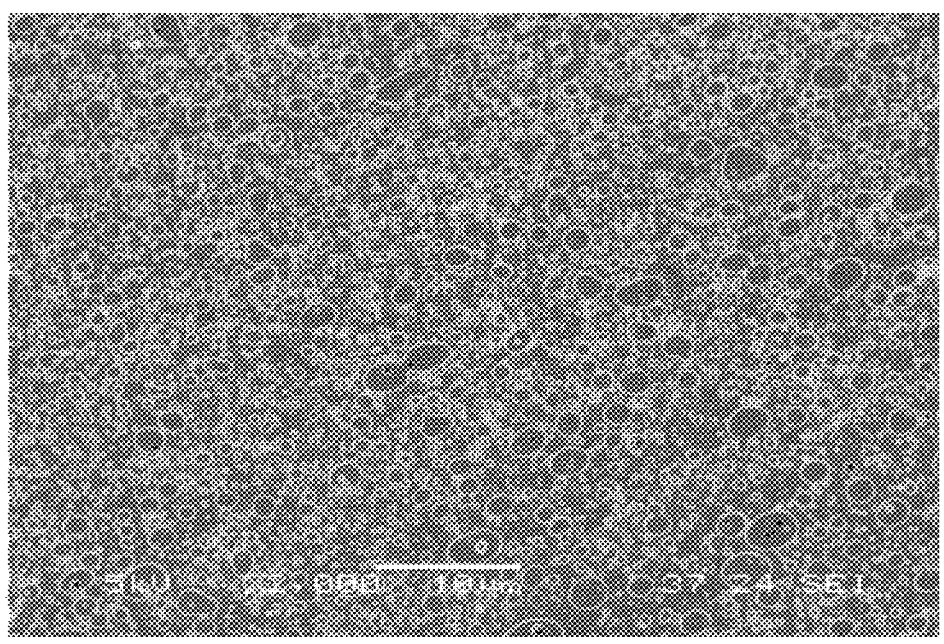

[FIG. 11]
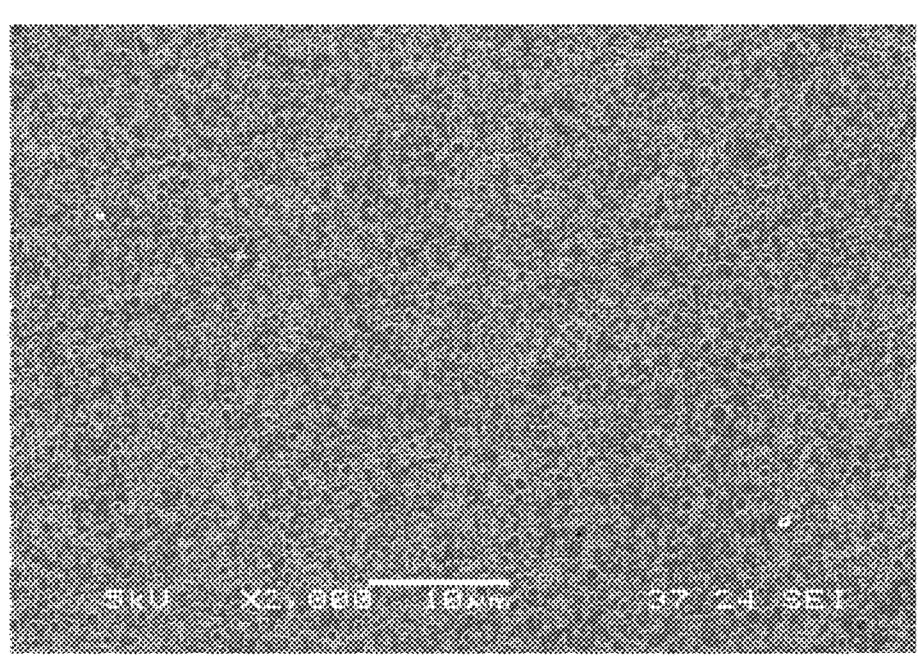

DOWNHOLE TOOL OR MEMBER THEREOF CONTAINING POLYGLYCOLIC ACID

TECHNICAL FIELD

The present invention relates to a resin composition, a downhole tool or a component thereof, a plug, and a well treatment method.

BACKGROUND ART

In order to recover hydrocarbon resources including petroleum and gas in the ground, a downhole (an underground drilling well) is provided, and a downhole tool and a downhole tool component are utilized. Downhole tools and downhole tool components are sometimes constituted by a degradable polymer since they are usually disposed by directly collapsing or dropping them in a downhole.

As a downhole tool component constituted by such a degradable polymer, for example, a downhole tool component made of polyglycolic acid is known. Polyglycolic acids are suitably used as materials for downhole tools or components thereof because they exhibit hydrolyzability while having high strength (see, for example, Patent Document 1).

Furthermore, as the material for a downhole tool or a component thereof, a resin composition that quickly degrades after retaining the weight and shape of the resin for a certain period in hot water having a temperature higher than 135° C., which is required for an oil field drilling technique, is known (see, for example, Patent Document 2).

Furthermore, as a resin composition, a resin composition containing a polyester and a cyclic carbodiimide compound is known (see, for example, Patent Document 3).

Furthermore, in a resin composition as a material for a molded product, a molded product formed from an aliphatic polyester resin composition containing from 1 to 30 parts by mass of a carboxylic anhydride with respect to 100 parts by mass of an aliphatic polyester containing 50 mass % or more of polyglycolic acid is known. It is known that said molded product exhibits excellent degradability even in a downhole environment at a relatively low temperature such as lower than 66° C. (for example, see Patent Document 4).

CITATION LIST

Patent Document

Patent Document 1: WO 2013/183363

Patent Document 2: JP 2015-160872 A

Patent Document 3: WO 2010/071213

Patent Document 4: JP 2015-172106 A

SUMMARY OF INVENTION

Technical Problem

As described above, the resin composition containing polyglycolic acid is useful as a material for a downhole tool or a component thereof from the viewpoint of strength and hydrolyzability. However, as the environmental temperature increases, the thickness of the downhole tool or a component thereof tends to decrease rapidly due to the hydrolysis of polyglycolic acid. Therefore, a downhole tool or a component thereof containing polyglycolic acid as the material thereof may not be able to maintain its form of use for an intended period of time, particularly in a well at a high temperature (e.g., 80° C.).

An object of an aspect of the present invention is to provide a technique capable of suppressing a decrease in thickness of a downhole tool or a component thereof in a well at a high temperature.

Solution to Problem

In order to solve the above-mentioned issues, the resin composition according to an aspect of the present invention includes: 50 parts by mass or more and 97 parts by mass or less of polyglycolic acid; 3 parts by mass or more and 50 parts by mass or less of polybutylene terephthalate; and 2 parts by mass or more and 15 parts by mass or less of a cyclic carbodiimide compound with respect to 100 parts by mass of a total amount of the polyglycolic acid and the polybutylene terephthalate.

Furthermore, in order to solve the above-mentioned issues, a downhole tool or a component thereof according to an aspect of the present invention includes a resin molded article formed by molding using the above-mentioned resin composition as a raw material.

Furthermore, in order to solve the above-mentioned issues, a plug according to an aspect of the present invention is a plug for temporarily preventing circulation of a fluid in a well and is the above-mentioned downhole tool or a component thereof.

Furthermore, in order to solve the above-mentioned issues, the downhole tool according to an aspect of the present invention includes a tubular component and the plug according to any one of claims 3 to 7, in which the tubular component includes an opening part in a circumferential surface of the tubular component, the opening part communicating between an inside and an outside of the tubular component, and the plug is engaged with the tubular component in a way that closes the opening part.

Furthermore, in order to solve the above-mentioned issues, the well treatment method according to an aspect of the present invention includes: temporarily isolating one or more areas of at least one of a well or a downhole tool by using the plug described above; and eliminating the temporary isolation with the plug by degrading the resin molded article portion of the plug and changing a flow path of a fluid in the one or more areas.

Furthermore, in order to solve the above-mentioned issues, the well treatment method according to an aspect of the present invention includes: preventing a flow of a fluid in a well by installing the plug described above in the well; and degrading the resin molded article and restoring the flow of the fluid.

Furthermore, in order to solve the above-mentioned issues, the well treatment method according to an aspect of the present invention includes: introducing a downhole tool into a well, the downhole tool including a first opening part at one edge, a second opening part at the other edge, and a third opening part between the one edge and the other edge, the third opening part isolated by the plug according to any one of claims 3 to 7 as a downhole tool component; injecting a fluid from a ground into the downhole tool through the first opening part and washing the well by discharging the fluid from the second opening part into the well; and degrading the resin molded article portion of the plug after the washing and enabling circulation of a fluid between an inside and an outside of the downhole tool through the third opening part.

Advantageous Effects of Invention

According to an aspect of the present invention, a technique capable of suppressing a decrease in thickness of a downhole tool or a component thereof in a well at a high temperature can be provided.

BRIEF DESCRIPTION OF THE DRAWINGS

FIG. 1 is a schematic view of a cross section of a downhole tool to which a first aspect of a plug according to an embodiment of the present invention is applied.

FIG. 2 is an enlarged schematic view of a part of a cross section of a downhole tool to which a modified example 1 of the first aspect of the plug according to an embodiment of the present invention is applied.

FIG. 3 is an enlarged schematic view of a part of a cross section of a downhole tool to which a modified example 2 of the first aspect of the plug according to an embodiment of the present invention is applied.

FIG. 4 is a schematic view of a cross section of a downhole plug according to an embodiment of the present invention when the downhole plug is at a predetermined position in a well.

FIG. 5 is a schematic view of a cross section of the downhole plug when the downhole plug isolates the well.

FIG. 6 explains an observation position of a microscopic structure of a resin molded article.

FIG. 7 presents an SEM photograph illustrating the dispersion state of a resin in a cross section of a resin molded article having a mass ratio of PGA:PBT of 90:10.

FIG. 8 presents an SEM photograph illustrating the dispersion state of a resin in a cross section of a resin molded article having a mass ratio of PGA:PBT of 70:30.

FIG. 9 presents an SEM photograph illustrating the dispersion state of a resin in a cross section of a resin molded article having a mass ratio of PGA:PBT:cyc-CDI of 70:30:5.

FIG. 10 presents an SEM photograph illustrating the dispersion state of a resin in a cross section of a resin molded article having a mass ratio of PGA:PET of 70:30.

FIG. 11 presents an SEM photograph illustrating the dispersion state of a resin in a cross section of a resin molded article having a mass ratio of PGA:PET:cyc-CDI of 70:30:5.

DESCRIPTION OF EMBODIMENTS

Hereinafter, regarding the present invention, the embodiments thereof will be described. In the present specification, unless otherwise specified, "to" means a range including numerical values at both ends and equal to or more/less than the range. In the present specification, "polyglycolic acid" is also referred to as "PGA", "polybutylene terephthalate" is also referred to as "PBT", and a "cyclic carbodiimide compound" is also referred to as "cyc-CDI".

(Resin Composition)

The resin composition according to an embodiment of the present invention includes polyglycolic acid, polybutylene terephthalate, and a cyclic carbodiimide compound.

[Polyglycolic Acid (PGA)]

The polyglycolic acid in the present embodiments is a polymer containing a repeating unit represented by $-(-O-CH_2-CO-)-$. The polyglycolic acid is preferably a homopolymer of glycolic acid, but may also be a copolymer of glycolic acid and other monomer components.

Examples of other monomer components in the case where the polyglycolic acid is a copolymer include hydroxycarboxylic acids such as L-lactic acid, D-lactic acid, 3-hydroxybutanoic acid, and 1-hydroxyhexanoic acid; ester compounds composed of a diol and a dicarboxylic acid, such as a condensate of 1,4-butanediol and succinic acid, and a condensate of 1,4-butanediol and adipic acid; cyclic esters and lactones produced by intramolecular condensation of the other monomer components described above, and cyclic carbonates such as trimethylene carbonate.

In a case where the polyglycolic acid is a copolymer, the structural unit derived from glycolic acid is 70 mol % or more, preferably 80 mol % or more, and more preferably 90 mol % or more.

In a case where the polyglycolic acid is a copolymer, a melt viscosity of the copolymer is preferably less than a melt viscosity of a glycolic acid homopolymer having the same molecular weight as that of the copolymer. When the copolymer has such a melt viscosity, there is no need to increase the melting temperature of the resin composition. Therefore, a decrease in the molecular weight of the polyglycolic acid due to the degradation of the structural unit derived from glycolic acid can be suppressed. Therefore, it is preferable from the viewpoint of increasing the strength of the resin molded article obtained by molding said resin composition.

The weight average molecular weight (Mw) of the polyglycolic acid described above can be appropriately determined within a range in which the effects of an embodiment of the present invention can be obtained. The molecular weight of the polyglycolic acid is preferably more than 20000 in terms of a weight average molecular weight from the viewpoint of exhibiting the water vapor barrier property by the polyglycolic acid in the resin molded article. Furthermore, the molecular weight of polyglycolic acid is more preferably 70000 or more, further preferably 150000 or more, from the viewpoint of developing a desired strength as a downhole tool or a component thereof. An upper limit of the weight average molecular weight of the polyglycolic acid is not particularly limited, but from the viewpoint of enabling solidification- and extrusion-molding or injection molding, the upper limit is typically preferably 500000 or less and more preferably 300000 or less in terms of a weight average molecular weight.

[Polybutylene Terephthalate (PBT)]

The polybutylene terephthalate in an embodiment of the present invention is a polyester having a structure in which a terephthalic acid unit and a 1,4-butanediol unit are ester-bonded. The polybutylene terephthalate is preferably a homopolymer of polybutylene terephthalate obtained by polycondensation of terephthalic acid and 1,4-butanediol, but may be a copolymer or a mixture thereof.

For example, the polybutylene terephthalate may contain dicarboxylic acid units other than terephthalic acid. Examples of other dicarboxylic acids include aromatic dicarboxylic acids other than terephthalic acid, alicyclic dicarboxylic acids and aliphatic dicarboxylic acids. Examples of the aromatic dicarboxylic acids include isophthalic acid, orthophthalic acid, 1,5-naphthalenedicarboxylic acid, 2,5-naphthalenedicarboxylic acid, 2,6-naphthalenedicarboxylic acid, biphenyl-2,2'-dicarboxylic acid, biphenyl-3,3'-dicarboxylic acid, biphenyl-4,4'-dicarboxylic acid, bis(4,4'-carboxyphenyl)methane, anthracenedicarboxylic acid and 4,4'-diphenyletherdicarboxylic acid. Examples of the alicyclic dicarboxylic acids include 1,4-cyclohexanedicarboxylic acid and 4,4'-dicyclohexyldicarboxylic acid. Examples of the aliphatic dicarboxylic acids include adipic acid, sebacic acid, azelaic acid, and dimeric acid.

Furthermore, the polybutylene terephthalate may contain other diol units in addition to 1,4-butanediol. Examples of the other diol units include aliphatic or alicyclic diols having 2 to 20 carbon atoms and bisphenol derivatives. More specific examples of other diol units include ethylene glycol, propylene glycol, 1,5-pentanediol, 1,6-hexanediol, neopentyl glycol, decamethylene glycol, cyclohexanedimethanol, 4,4'-dicyclohexylhydroxymethane, 4,4'-dicyclohexylhydroxypropane and ethylene oxide-added diols of bisphenol A.

Furthermore, the polybutylene terephthalate may contain a small amount of a structural unit derived from a trifunctional monomer for introducing a branched structure, a monomer having four or more functional groups, or a monofunctional compound for adjusting the molecular weight, in addition to the above-mentioned bifunctional monomer Examples of the trifunctional monomer include trimellitic acid, trimesic acid, pyromellitic acid and trimethylolpropane. Examples of the tetrafunctional monomer include pentaerythritol. Examples of the hexafunctional monomer include dipentaerythritol.

The polybutylene terephthalate in an embodiment of the present invention may be polybutylene terephthalate modified by copolymerization. Examples of such modified polybutylene terephthalate include polyester ethers copolymerized with polyalkylene glycols, particularly polytetramethylene glycol, dimer acid-copolymerized polybutylene terephthalate, and isophthalic acid-copolymerized polybutylene terephthalate. The modified polybutylene terephthalate refers to polybutylene terephthalate in which the amount of the copolymer is 1 mol % or more and less than 50 mol % in all segments of the polybutylene terephthalate.

The amount of the terminal carboxyl groups in polybutylene terephthalate may be appropriately selected and determined. The amount of the terminal carboxyl groups in polybutylene terephthalate may be 60 eq/ton or less, and from the viewpoint of alkali resistance and hydrolysis resistance, the amount is preferably 50 eq/ton or less, further preferably 30 eq/ton or less. The amount of the terminal carboxyl groups in polybutylene terephthalate may be 10 eq/ton from the viewpoint of producibility in the production of the polybutylene terephthalate.

The amount of the terminal carboxyl groups in polybutylene terephthalate can be measured by dissolving 0.5 g of polybutylene terephthalate resin in 25 mL of benzyl alcohol and titrating the resulting solution using a 0.01 mol/L solution of sodium hydroxide in benzyl alcohol. The amount of the terminal carboxyl groups can be appropriately adjusted by known production conditions such as a raw material charging ratio at the time of polymerization.

The inherent viscosity of the polybutylene terephthalate in an embodiment of the present invention is preferably from 0.5 to 2 dL/g and more preferably from 0.6 to 1.5 dL/g from the viewpoint of moldability and mechanical properties. Said inherent viscosity can be measured in a 1:1 (mass ratio) mixed solvent of tetrachloroethane and phenol at 30° C.

The polybutylene terephthalate according to an embodiment of the present invention may be either a commercially available product or a synthetic product, Examples of the commercially available product include "NOVADURAN" (trade name) available from Mitsubishi Engineering-Plastics Corporation. The synthesized product can be produced by a known method in which a dicarboxylic acid component containing terephthalic acid as a main component or an ester derivative thereof and a diol component containing 1,4-butanediol as a main component are subjected to melt polymerization in a batch or continuous manner.

The weight average molecular weight of the polybutylene terephthalate in an embodiment of the present invention may be appropriately determined within a range in which the effect of an embodiment of the present invention can be obtained. When the molecular weight of the polybutylene terephthalate is too small, the effect of suppressing the penetration of water into the resin molded article may become insufficient, whereas when the molecular weight is too large, the dispersibility in a resin molded article may become poor. From the viewpoint of the effect of suppressing the penetration of water, the molecular weight of the polybutylene terephthalate is preferably 5000 or more, more preferably 8000 or more, and still more preferably 10000 or more in terms of the weight average molecular weight. Furthermore, from the viewpoint of realizing good dispersibility of the polybutylene terephthalate in the resin molded article, the molecular weight of the polybutylene terephthalate is preferably 50000 or less, more preferably 30000 or less, and still more preferably 20000 or less in terms of the weight average molecular weight.

$M_T/M_A$, a ratio of the weight average molecular weight $M_T$ of the polybutylene terephthalate to the weight average molecular weight $M_A$ of the polyglycolic acid, is preferably 0.01 or more, more preferably 0.02 or more, and still more preferably 0.03 or more, from the viewpoint of further enhancing the effect of suppressing water penetration. Furthermore, $M_T/M_A$ is preferably 1.0 or less, more preferably 0.8 or less, and still more preferably 0.3 or less from the viewpoint of achieving good dispersibility in a resin molded article. When $M_T/M_A$ is sufficiently small, polybutylene terephthalate is easily dispersed sufficiently uniformly and finely in the polyglycolic acid. When $M_T/M_A$ is sufficiently large, a sufficiently large polybutylene terephthalate phase is formed in the polyglycolic acid phase in a resin composition or a resin molded article, and the effect of suppressing the penetration of water into the resin molded article is easily enhanced.

Incidentally, the weight average molecular weights of PGA and PBT can be measured by a known method such as gel permeation chromatography (GPC), but may also be catalog values.

[Cyclic Carbodiimide Compound (Cyc-CDI)]

The cyclic carbodiimide compound contained in the polyglycolic acid resin composition in the present embodiments is a compound having a cyclic structure in which the first nitrogen and the second nitrogen of a carbodiimide group are bonded by a bonding group. The cyclic carbodiimide compound can be represented, for example, by Formula (I) below.

[Chemical Formula 1]

(I)

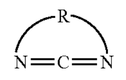

In Formula (I), R is one or more divalent bonding groups selected from the group consisting of aliphatic groups, alicyclic groups, and aromatic groups. In Formula (I), R may contain one or more heteroatoms. Examples of the heteroatom include oxygen (O), nitrogen (N), sulfur (S), and phosphorus (P). Further, R may contain a ring structure, and the ring structure may contain a carbodiimide structure.

For example, the cyclic carbodiimide compound may be a divalent bicyclic compound having two cyclic structures in which the first nitrogen and the second nitrogen of a carbodiimide group are bonded by a bonding group, and these cyclic structures share some carbon atoms. Examples of the bicyclic compound include a bicyclo compound in which two cyclic structures share two or more carbon atoms, and a spiro compound in which two cyclic structures share one carbon atom. The two cyclic structures each contain a carbodiimide group, and may have the same structure as each other or different structures from each other.

The kind and number of atoms constituting a main chain of the cyclic structure can be appropriately determined as long as the effects of the present embodiments can be achieved. For example, the number of atoms directly constituting the cyclic structure is preferably 8 or more and more preferably 10 or more. In addition, the number of the atoms is preferably 50 or less and more preferably 20 or less.

Further, R may further have a monovalent substituent as long as the effects of the present embodiments can be achieved. More specifically, R may be a di- to tetra-valent aliphatic group having 1 to 20 carbon atoms, a di- to tetra-valent alicyclic group having 3 to 20 carbon atoms, a di- to tetra-valent aromatic group having 5 to 15 carbon atoms, or a combination thereof. Examples of the combination include alkylene-arylene groups in which an alkylene group and an arylene group are bonded.

Examples of the aliphatic group in R include alkylene groups having 1 to 20 carbon atoms, alkanetriyl groups having 1 to 20 carbon atoms, and alkanetetrayl groups having 1 to 20 carbon atoms.

Examples of the alkylene groups include a methylene group, an ethylene group, a propylene group, a butylene group, a pentylene group, a hexylene group, a heptylene group, an octylene group, a nonylene group, a decylene group, a dodecylene group, and a hexadecylene group.

Examples of the alkanetriyl groups include a methanetriyl group, an ethanetriyl group, a propanetriyl group, a butanetriyl group, a pentanetriyl group, a hexanetriyl group, a heptanetriyl group, an octanetriyl group, a nonanetriyl group, a decanetriyl group, a dodecanetriyl group, and a hexadecanetriyl group.

Examples of the alkanetetrayl groups include a methanetetrayl group, an ethanetetrayl group, a propanetetrayl group, a butanetetrayl group, a pentanetetrayl group, a hexanetetrayl group, a heptanetetrayl group, an octanetetrayl group, a nonanetetrayl group, a decanetetrayl group, a dodecanetetrayl group, and a hexadecanetetrayl group.

Examples of the alicyclic group in R include cycloalkylene groups having 3 to 20 carbon atoms, cycloalkanetriyl groups having 3 to 20 carbon atoms, and cycloalkanetetrayl groups having 3 to 20 carbon atoms.

Examples of the cycloalkylene groups include a cyclopropylene group, a cyclobutylene group, a cyclopentylene group, a cyclohexylene group, a cycloheptylene group, a cyclooctylene group, a cyclononylene group, a cyclodecylene group, a cyclododecylene group, and a cyclohexadecylene group.

Examples of the cycloalkanetriyl groups include a cyclopropanetriyl group, a cyclobutanetriyl group, a cyclopentanetriyl group, a cyclohexanetriyl group, a cycloheptanetriyl group, a cyclooctanetriyl group, a cyclononanetriyl group, a cyclodecanetriyl group, a cyclododecanetriyl group, and a cyclohexadecanetriyl group.

Examples of the cycloalkanetetrayl groups include a cyclopropanetetrayl group, a cyclobutanetetrayl group, a cyclopentanetetrayl group, a cyclohexanetetrayl group, a cycloheptantetrayl group, a cyclooctanetetrayl group, a cyclononanetetrayl group, a cyclodecanetetrayl group, a cyclododecanetetrayl group, and a cyclohexadecanetetrayl group.

Examples of the aromatic group in R include arylene groups having 5 to 15 carbon atoms, arenetriyl groups having 5 to 15 carbon atoms, and arenetetrayl groups having 5 to 15 carbon atoms. The aromatic group may contain one or more heteroatoms.

Examples of the arylene groups include a phenylene group and a naphthalenediyl group.

Examples of the arenetriyl group (trivalent) include a benzenetriyl group and a naphthalenetriyl group.

Examples of the arenetetrayl groups (tetravalent) include a benzenetetrayl group and a naphthalenetetrayl group.

Examples of the substituent that R may have include alkyl groups having 1 to 20 carbon atoms, aryl groups having 6 to 15 carbon atoms, halogen atoms, nitro groups, amide groups, hydroxyl groups, ester groups, ether groups, and aldehyde groups.

Among the cyclic carbodiimide compounds described above, using a compound having only one carbodiimide group in one cyclic structure is preferred from the viewpoint of preventing deterioration of the working environment caused by the characteristic odor of the isocyanate compound. This is because the cyclic carbodiimide of the above structure does not release a compound having an isocyanate group even if it reacts with the carboxyl group at the end of the polyglycolic acid.

Examples of the cyclic carbodiimide compound described above include a compound represented by Formula (II) or Formula (III) below.

[Chemical Formula 2]

(II)

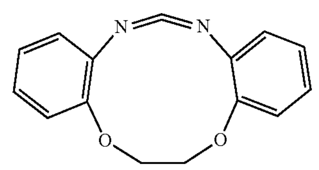

(III)

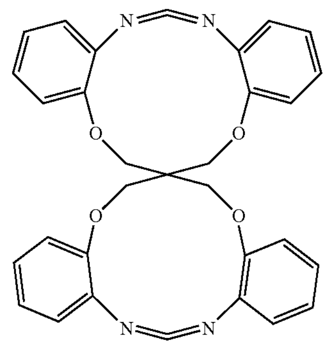

When the cyclic carbodiimide compound contains a plurality of carbodiimide groups in the same molecular structure, the cyclic carbodiimide compound may also function as a chain extender by a reaction with the terminal of the carboxyl group of the polymer. Therefore, the cyclic carbodiimide compound is preferably a compound containing a plurality of carbodiimide groups in the same molecular structure as represented by Formula (III), for example, from the viewpoint of suppressing a decrease in the molecular weight of polyglycolic acid due to degradation during melt-kneading at a high temperature.

[Content]

The content of PGA content in the resin composition according to an embodiment of the present invention is 50 parts by mass or more and 97 parts by mass or less. The PGA content is preferably 50 parts by mass or more from the viewpoint of sufficiently imparting quick degradation properties derived from the PGA to the resin molded article, and is more preferably 55 parts by mass or more, and still more preferably 60 parts by mass or more, from the viewpoint of improving said degradation properties. Furthermore, the PGA content is preferably 97 parts by mass or less from the viewpoint of sufficiently suppressing the thickness reduction rate of the resin molded article in 80° C. water, and is more preferably 90 parts by mass or less and still more preferably 80 parts by mass or less from the viewpoint of suppressing the thickness reduction rate.

The PBT content in a resin composition according to an embodiment of the present invention is 3 parts by mass or more and 50 parts by mass or less. The PET content is preferably 3 parts by mass or more from the viewpoint of sufficiently suppressing the thickness reduction rate of the resin molded article in 80° C. water, and from the viewpoint of suppressing the thickness reduction rate, the content is more preferably 20 parts by mass or more, and still more preferably 25 parts by mass or more. In addition, the PBT content is preferably 50 parts by mass or less from the viewpoint of sufficiently exhibiting the degradation properties of the resin molded article, and is more preferably 45 parts by mass or less and still more preferably 40 parts by mass or less from the viewpoint of improving said degradation properties.

The cyc-CDI content in a resin composition according to an embodiment of the present invention is 2 parts by mass or more and 15 parts by mass or less with respect to 100 parts by mass of the total amount of PGA and PBT. The cyc-CDI content with respect to 100 parts by mass of the total amount of PGA and PBT is preferably 2 parts by mass or more from the viewpoint of achieving both the expression of the degradation properties and the effect of suppressing the thickness reduction rate, and from the viewpoint of improving the effect of suppressing the thickness reduction rate, the content is more preferably 4 parts by mass or more, and still more preferably 5 parts by mass or more. In addition, the cyc-CDI content is preferably 15 parts by mass or less from the viewpoint of achieving both the effect due to the addition of cyc-CDI and economic efficiency, and is more preferably 10 parts by mass or less and even more preferably 8 parts by mass or less from the viewpoint of economic efficiency.

Since the resin composition according to an embodiment of the present invention has the above-mentioned configuration, it is possible to suppress the thickness reduction rate in water at 80° C. while having the degradation properties of PGA, as compared with the case where PGA and PBT are not used in combination and only PGA is used alone. It is considered that this is because the PBT chain is chain-extended by cyc-CDI at the time of molding. As a result, the melt-miscibility of PGA and PBT at the time of molding decreases, and a streaky or net-shaped PBT phase is formed in the resin molded article. As a result, it is considered that the contact of water with the PGA phase in the resin molded article is suppressed, and the effect of delayed degradation as described above is exhibited.

[Additional Component]

The resin composition according to an embodiment of the present invention may contain an additional additive, such as a thermal stabilizer, an antioxidant, an impact resistance modifier, a cross-linker, an organic filler, an inorganic filler, and a colorant, unless the desired effects of the embodiments of the present invention are impaired.

[Properties]

The form of the resin composition according to an embodiment of the present invention is not limited. The resin composition may be a mixture of powdery raw materials or may be a melt-kneaded product of these raw materials such as pellets. For example, in the resin composition, the terminal of PGA may be capped with a cyclic carbodiimide compound, or the terminal of PBT may be capped with a cyclic carbodiimide compound. Here, the "capped structure" means a structure formed by reaction of the carboxyl groups at the end blocks of PGA or PBT and cyclic carbodiimide compounds. A part of the terminal of PGA or PBT is preferably capped with cyclic carbodiimide compounds. In the case where a part of the terminal of PGA or PBT is capped with a cyclic carbodiimide compound, the resin composition of the present embodiments may further contain, in addition to PGA, PBT and the cyclic carbodiimide compound, a derivative of the cyclic carbodiimide compound which is formed by, for example, reaction and bonding of the cyclic carbodiimide compound to the terminal of PGA or PBT.

[Resin Molded Article]

(Method of Producing Resin Molded Article)

A resin molded article is formed by molding using the resin composition of an embodiment of the present invention as a raw material. The present resin molded article can be produced by mixing PGA, PBT, and cyc-CDI and by solidification- and extrusion-molding or injection molding of the mixture. The mixture may be obtained by melt-kneading PGA, PBT and cyc-CDI, and pelletizing the melt-kneaded product. When the mixture is melt-kneaded, the temperature is preferably from 220 to 280° C. and more preferably from 230 to 260° C. from the viewpoint of preventing thermolysis of PGA.

By mixing PGA, PBT and cyc-CDI at the above-mentioned temperature, a part of cyc-CDI reacts with the carboxyl groups at the terminals of PGA and PBT. As a result, the terminal of PGA or PBT is capped with cyc-CDI. A temperature when the resin molded article is solidification- and extrusion-molded or injection-molded is preferably from 220 to 280° C. and more preferably from 230 to 260° C.

(Degradation of Resin Molded Article)

Since the resin molded article is formed from the resin composition according to an embodiment of the present invention, the resin molded article is suitably degraded even in a fluid or water having a low salt concentration. When the present resin molded article is immersed in water, the molecular weight of PGA in the surface part of the resin molded article is reduced due to hydrolysis. This results in embrittlement of the surface part of the resin molded article. Water readily permeates into PGA with reduced molecular weight. Thus, PGA is gradually hydrolyzed from the surface part of the resin molded article to the center part. As such, the embrittlement of the resin molded article proceeds. When the molecular weight of PGA with a reduced molecular weight is further reduced due to further hydrolysis, an oligomer or glycolic acid, which is a product of the hydrolysis, elutes in water. As a result, the resin molded article loses its shape. The resin molded article is thus ultimately degraded. When the resin molded article is used for a downhole tool or a component thereof, which will be described later, the isolation by the resin molded article is released by degradation of the resin molded article.

In the present specification, the rate of progress of embrittlement of the resin molded article is defined as the rate of reduction in thickness. The rate of reduction in thickness is a rate at which the thickness of a non-brittle part of the resin molded article decreases. The embrittlement proceeds from the surface toward the center of the resin molded article, and the thickness of the non-brittle part decreases from the surface side. Thus, the rate of progress of the embrittlement indicates a positive correlation with the reduction rate of thickness, Herein, the time duration starting from the time when the resin molded article is immersed in water to the time when PGA in the surface part of the molded article is hydrolyzed, thereby starting to reduce the thickness of the molded article is referred to as "degradation lead time". In addition, the phenomenon in which the resin molded article becomes brittle due to the decrease in molecular weight of PGA caused by the hydrolysis of PGA is referred to as "embrittlement". The part of the resin molded article that becomes brittle is referred to as a brittle layer. In an embodiment of the present invention, the thickness reduction rate can be adjusted by the amount of PBT or the amount of cyc-CDI.

The thickness reduction rate of said resin molded article in 80° C. water may be appropriately determined depending on the use of the resin molded article. When the use of the resin molded article is a downhole tool or a component thereof described later, the thickness reduction rate of the resin molded article in 80° C. water is preferably 0.1 μm/hr or more, more preferably 1 μm/hr or more, and still more preferably 5 μm/hr or more from the viewpoint of shape stability in a high-temperature environment. Furthermore, the thickness reduction rate is preferably less than 60 μm/hr, more preferably less than 35 μm/hr, and even more preferably less than 30 μm/hr.

The resin molded article according to the present embodiments is formed from a resin composition containing PGA, PBT, and cyc-CDI as described above. PGA has a high water vapor barrier property. In the resin molded article according to the present embodiments, hydrolysis and embrittlement of the center part do not thus occur until the surface part becomes brittle, and thus the embrittlement does not proceed rapidly, The resin molded article in the present embodiments contains PBT. PBT also has sufficiently high water vapor barrier properties and sufficiently low hydrolyzability compared to PGA. As presented in the examples described later, when the amount of PBT is 15 parts by mass or less with respect to 100 parts by mass of the total amount of PGA and PBT, PBT tends to be finely dispersed in the PGA phase. Since water diffuses along the interface between the PGA phase and the PBT phase, the fine dispersion of the PBT phase in the PGA phase basically contributes to the acceleration of the degradation of the PGA phase. On the other hand, as the amount of PBT added increases further, PBT aggregates in the PGA phase and the distance between the PBT phases increases, so that the path length of water until it reaches the PGA phase becomes longer. In addition, when the resin composition of the resin molded article according to the present embodiments further contains cyc-CDI, the PBT phase dispersed in the PGA phase becomes larger compared to a case where cyc-CDI is not contained, and the PBT phase may be distributed in a streak shape or a mesh shape. For this reason, diffusion of water molecules in the resin molded article is further suppressed. This further delays the progress of the embrittlement.

Furthermore, the resin molded article according to the present embodiments contains cyc-CDI or carbodiimide groups. Since water molecules having passed through the embrittlement layer react with the cyc-CDI or the carbodiimide groups, the diffusion of water molecules is further suppressed. This further delays the progress of the embrittlement. The carbodiimide groups contained in the resin composition can be calculated, for example, by $^1H$ NMR measurement using dimethyl sulfone as a standard substance.

Thus, the resin molded article in the present embodiments can delay hydrolysis and embrittlement even after the degradation lead time elapses in water at a high temperature. Therefore, in the application of a downhole tool or a component thereof described later, the isolation retention time can be extended even under a high temperature condition.

(Other Physical Properties of Resin Molded Article)

The resin molded article in the present embodiments has a tensile strength preferably of 80 MPa or more, more preferably of 90 MPa or more, and even more preferably of 100 MPa or more from the viewpoint of withstanding high pressure in a well and maintaining the isolation in the use in a downhole tool or a component thereof mentioned below. In addition, from the viewpoint of facilitating mold processing, the tensile strength is preferably 400 MPa or less, more preferably 370 MPa or less, and even more preferably 350 MPa or less. Here, the tensile strength of the resin molded article is measured by using a type 1A tensile test piece and subjecting the tensile test piece to tensile stress at a rate of 50 mm/min in an environment of 23° C. in accordance with ISO 527.

[Summary of Resin Composition]

The resin composition according to the first embodiment of the present invention contains 50 parts by mass or more and 97 parts by mass or less of PGA, 3 parts by mass or more and 50 parts by mass or less of PBT, and 2 parts by mass or more and 15 parts by mass or less of cyc-CDI with respect to 100 parts by mass of the total amount of PGA and PBT. In a downhole tool or a component thereof using a resin composition with such a composition as a material, it is possible to further suppress the entry of water in an environment of 80° C. water as compared with a composition not containing PBT. Therefore, the resin composition makes it possible to suppress a decrease in the thickness of a downhole tool or a component thereof in a well at a high temperature.

For the resin composition according to the second embodiment of the present invention, in the first embodiment described above, the cyc-CDI content may be 4 parts by mass or more with respect to 100 parts by mass of the total amount of PGA and PBT. This configuration is more effective from the viewpoint of reducing the thickness reduction rate of the resin molded article in water at 80° C. as compared with a composition not containing PBT.

[Downhole Tool Component]

A downhole tool and a downhole tool component according to an embodiment of the present invention include a resin molded article formed by molding using the resin composition according to an embodiment of the present invention as a raw material. A downhole tool or a component thereof according to an embodiment of the present invention may partially include a resin molded article or may be entirely formed of a resin molded article. When a part of the downhole tool or a member thereof according to an embodiment of the present invention includes a resin molded article, the resin molded article portion may be an integral part of the downhole tool or the component thereof, or may be a separate part that is separately combined.

In embodiments of the present invention, a downhole tool refers to the tool itself for forming or collecting downhole for recovering hydrocarbon resources such as petroleum and gas in the ground. Examples of the downhole tool include a plug, a wash pipe, a cement retainer, a perforation gun, a ball sealer, an isolating plug, and a packer.

Further, in an embodiment of the present invention, the downhole tool component means a component constituting the coupling portion in the downhole tool. The coupling portion means a portion for coupling a plurality of components constituting the downhole tool to form the downhole tool, or a portion for directly or indirectly coupling to the downhole to realize a form of use in the downhole.

It should be noted that the exemplary tools described above may be classified as downhole tools or downhole tool components depending on their configuration or usage. For example, the plug includes a plug as a downhole tool and a plug as a downhole tool component.

[Plug]

A plug according to an embodiment of the present invention is a plug for temporarily preventing the circulation of a fluid in a well, and is the downhole tool or a component thereof described above. The plug can be both a plug that is a downhole tool and a plug that is a downhole tool component, as described above. Examples of plugs as downhole tools include frac plugs and bridge plugs. Examples of plugs as downhole tool components include balls, dirt, disks, screws, and packers.

[Specific Aspect of Plug]

(First Aspect of Plug)

A first aspect of the plug according to an embodiment of the present invention to be described is a plug configured for use in closing an opening part provided in a circumferential surface of a tubular component inserted into a well, the opening part communicating between an inside and an outside of the tubular component. Such a plug can be, for example, a ball, a dart, a disk, a screw, and a packer to be applied to a downhole tool. In addition, examples of the downhole tools to which these plugs of the first aspect are applied include a wash pipe for washing the well and/or stimulating a subterranean formation before fracturing.

An aspect of a case where the plug is a screw configured to be applied to a downhole tool will be described using FIG. 1. FIG. 1 is a schematic view of a cross section of a downhole tool to which the plug according to the first aspect of the present invention is applied.

A downhole tool 1 illustrated in FIG. 1 is inserted into a well and includes a tubular main body 14 as a tubular component. The downhole tool 1 has a first opening part 16 at a leading edge and a second opening part 17 at a trailing edge, and further has one or more third opening part(s) 18 between the leading edge and the trailing edge. "20" represents a well wall.

The third opening part 18 is provided in a circumferential surface of the tubular main body 14 and is an opening part communicating between the inside and the outside of the tubular main body 14. Into the third opening part 18, a threaded plug 11 is inserted to close the third opening part 18, and the plug 11 engages with the third opening part. The third opening part 18 of the tubular main body 14 is thus plugged by the plug 11.

Here, the "leading edge" of the downhole tool refers to an edge part located on the inlet side of the well in a state where the downhole tool is set in the well and refers to an edge part on the side to be inserted last when the downhole tool is inserted into the well. The "trailing edge" is an edge part on the opposite side from the leading edge, refers to an edge part located on the back side in the well when the well is viewed from the inlet, and refers to an edge part on the side to be inserted first when the downhole tool is inserted into the well.

As illustrated in FIG. 1, the plug 11 is a threaded plug that closes the opening part provided in the circumferential surface of the tubular component, the opening part communicating between the inside and the outside of the tubular component. The plug 11 is composed of the resin molded article according to the present embodiments.

The plug 11 is inserted into the third opening part 18 of the tubular main body 14, and this prevents a flow of a fluid from the inside toward the outside of the tubular main body 14 through the third opening part 18 accordingly. In addition, when the plug 11 composed of the resin molded article degrades, this eliminates the third opening part 18 accordingly. Consequently, this causes a flow of a fluid from the inside toward the outside of the tubular main body 14, or a flow of a fluid from the outside toward the inside of the tubular main body 14, through the third opening part 18.

The size of the plug 11 can vary depending on the thickness of the tubular main body 14 to which the plug 11 is applied, but in an example, the minimum distance LI between a first surface 121 of the plug 11 and a second surface 122 of the plug 11 can be 6 mm or longer and 65 mm or shorter, the first surface 121 being exposed to the outside of the tubular main body 14, the second surface 122 being exposed to the inside of the tubular main body 14, in a state where the plug 11 is inserted into the tubular main body 14.

Modified Example 1 of First Aspect

A modified example 1 of the first aspect of the plug according to the present embodiments will be described using FIG. 2. FIG. 2 is an enlarged schematic view of a part of a cross section of a downhole tool to which the modified example 1 of the first aspect of the plug according to an embodiment of the present invention is applied. In a downhole tool 2 according to the modified example 1, a third opening part 28 of a tubular main body 24 is plugged by a threaded plug 21 in the same manner as in the downhole tool 1 described above.

As illustrated in FIG. 2, the plug 21 according to a modified example 1 is a plug that closes the opening part in the same manner as the plug 11 described above, the opening part being provided in the circumferential surface of the tubular component and communicating between the inside and the outside of the tubular component. However, the plug 21 according to the modified example 1 differs from the plug 11 in that the plug 21 is composed of a main body part 22 formed of the resin molded article according to the present embodiments and an annular molded article 23 formed of a non-degradable material.

The annular molded article 23 in the modified example 1 is an annular component that covers the periphery of the main body part 22 and has a screw thread on the outer circumferential surface. Here, the main body part 22 is configured to be arranged inside the ring of the annular molded article 23. The annular molded article 23 in the modified example 1 is formed of a non-degradable material, such as SUS303 and SUS304. Here, the "non-degradable material" refers to a material that does not readily lose weight or thickness in a well environment. The annular molded article 23 is preferably formed of a material that does not substantially lose weight or thickness for 30 days or more in a well.

In the modified example 1, the plug 21 is inserted into the third opening part 28 of the tubular main body 24, and this prevents a flow of a fluid from the inside toward the outside of the tubular main body 24 through the third opening part 28 accordingly. In addition, when the main body part 22 of the plug 21 degrades, the main body part being composed of the resin molded article, this releases the third opening part 28 and causes, through the third opening part 28, or more specifically, through the inside of the ring of the annular molded article 23, a flow of a fluid from the inside toward the outside of the tubular main body 24, or a flow of a fluid from the outside toward the inside of the tubular main body 24.

The size of the main body part 22 may be appropriately set by those skilled in the art in the same manner as the size of the plug 11.

Modified Example 2 of First Aspect

A modified example 2 of the first aspect of the plug according to the present embodiments will be described using FIG. 3. FIG. 3 is an enlarged schematic view of a part of a cross section of a downhole tool to which the modified example 2 of the first aspect of the plug according to an embodiment of the present invention is applied. In a tubular main body 34 included in a downhole tool 3 in FIG. 3, a third opening part 38 communicating between an inside and an outside of the tubular main body 34 is provided in a circumferential surface of the tubular main body 34. A plug 31 engages with the inside of the tubular main body 34.

The plug 31, which is the modified example 2 of the first aspect, is applied to a tubular component having an opening part in its circumferential surface, the opening part communicating between an inside and an outside, in the same manner as the plug 11 of the first aspect described above but differs from the plug 11 in that the plug 31 is not inserted into the opening part. The plug 31 of the modified example 2 engages with the tubular component inside the circumferential surface of the tubular component to close the opening part. The plug 31 thus engages with the inside of the tubular main body 34, and the third opening part 38 is closed from the inside accordingly. This prevents a flow of a fluid from the inside toward the outside of the tubular main body 34 through the third opening part 38. In addition, when the portion composed of the resin molded article of the plug 324 degrades, this exposes the third opening part 38 accordingly. Consequently, this causes a flow of a fluid from the inside toward the outside of the tubular main body 34, or a flow of a fluid from the outside toward the inside of the tubular main body 34, through the third opening part 38.

(Second Aspect of Plug)

A second aspect of the plug according to the present embodiments includes a downhole plug (downhole tool), such as a frac plug or a bridge plug, that is configured to be inserted into a well. In the downhole plug of the present aspect, the resin molded article according to the present embodiments is used as a downhole tool component, such as a mandrel, a load ring, a cone, a socket, and a bottom, but is not limited to these. Hereinafter, a downhole plug, which is a second aspect of the plug according to the present embodiments will be described using FIG. 4. FIG. 4 is a schematic view of a cross section of a downhole plug according to an embodiment of the present invention when the downhole plug is at a predetermined position in a well. In FIG. 4, only one of cross sections of the downhole plug that are symmetrical with respect to the axis is illustrated.

A downhole plug 5 illustrated in FIG. 4 has a mandrel 51 corresponding to the tubular component; a ball 53; and a center element 52, a socket 54, cones 55*a* and 55*b*, slips 56*a* and 56*b*, equalizer rings 57*a* and 57*b*, a load ring 58, and a bottom 59. The center element 52, the socket 54, the cones 55*a* and 55*b*, the slips 56*a* and 56*b*, the equalizer rings 57*a* and 57*b*, the load ring 58, and the bottom 59 are all attached to the mandrel 51 to surround an outer circumferential surface of the mandrel 51. The downhole plug 5 has a tubular shape as a whole.

Here, the mandrel 51 functions as a central axis that supports the other components (hereinafter, side parts) disposed on the outer circumference of the mandrel 51 and as a receptor for the ball 53. The center element 52 is an annular rubber component for filling the gap between the mandrel 51 and a well wall 20 in the downhole plug 5, to isolate the well and is deformed by load.

The socket 54, the cone 55, the slip 56, the equalizer ring 57, and the load ring 58 all are elements for directly or indirectly transferring the load applied from a setting tool to the center element 52 when the downhole plug 5 is operated in the well.

The load ring 58 is a push tool that transfers the load applied from a setting tool to other side parts. The cone 55 has functions of promoting diameter expansion of the slip 56 in the circumferential direction and of compressing the center element 52. The socket 54 has a function of preventing the center element 52 from flowing out to the other side when the well is viewed from the inlet.

The bottom 59 has functions of preventing the downhole plug 5 from operating due to collision with the well wall 20 while the downhole plug 5 is conveyed in the well, and of fixing other side parts when they are set.

[Well Treatment Method]

The plug described above is a plug that temporarily prevents circulation of a fluid in a well and can be used in well treatment. In the present embodiments, the well is preferably a cased well having a casing.

The well treatment includes:

- temporarily isolating one or more areas of at least one of a well or a downhole tool using the plug; and
- degrading the resin molded article of the plug to eliminate the isolation and change a flow path of a fluid in the one or more areas. Hereinafter, a case where the first aspect of the plug is applied to the well treatment and a case where the second aspect is applied to the well treatment will be separately described.

In a case where the first aspect of the "Specific aspect of plug" described above is applied to well treatment, the area where the plug temporarily isolates a flow path of a fluid is a downhole tool, and specifically, the tubular component that is inserted into the well corresponds to the downhole tool. In this case, the flow path of a fluid is the third opening part provided in the circumferential surface of the tubular component of the downhole tool, the third opening part communicating between the inside and the outside. The flow of a fluid is either a flow of a fluid from the inside toward the outside of the tubular component, that is, the downhole tool, through the opening part, or a flow of a fluid from the outside toward the inside of the downhole tool through the opening part.

In a case where the second aspect of the "Specific aspect of plug" described above is applied to well treatment, the flow path of a fluid temporarily isolated by the plug is a well, and the area temporarily isolated in the flow path of a fluid is a part of the well.

In addition, another aspect of the well treatment includes: installing the plug in a well to prevent a flow of a fluid in the well; and degrading the resin molded article constituting the plug to restore the flow of the fluid. In the well treatment, the resin molded article constituting the plug is degraded by water contained in the fluid present in the well, thus eliminating the isolation of the well and restoring the flow of the fluid.

Case of First Aspect

A more specific method of the well treatment using the plug of the first aspect will be described for treatment of washing a well and treatment of stimulating a subterranean formation using the downhole tool illustrated in FIG. 1. The well treatment method using the downhole tool illustrated in FIG. 1 is a well treatment method in a case where the threaded plug 11, which is the plug of the first aspect, temporarily plugs the third opening part 18 provided in the circumferential surface of the tubular main body 14 of the downhole tool 1.

The well is washed by the procedure as follows before fracturing for the purpose of increasing recovery efficiency of hydrocarbon resources. First, the downhole tool 1 is introduced to any position in the well using a fluid or the like. A fluid, such as water, is then injected through the first opening part 16 from the ground to the tubular main body 14, and the fluid is discharged from the second opening part 17 into the well to wash the well. A typical liquid, such as water, oil, or emulsion, is used; in addition, in some cases, the liquid may contain from several ppm to several tens of percent of a salt. At this time, the third opening part 18 is isolated by the plug 11, and thus the fluid injected from the first opening part 16 is not discharged from the third opening part 18. The fluid discharged to the well from the second opening part 17 then passes through the gap between the outside of the downhole tool 1 and the well wall 20 and is recovered on the ground together with sand, scale, or the like deposited on the inner wall of the well.

Here, the third opening part 18 is plugged by the plug 11, and this can prevent the fluid containing sand, scale, and the like after washing the well from entering the inside of the downhole tool through the third opening part 18. Thus, this can prevent a decrease in the efficiency of the washing operation. The important procedure is thus to maintain the plug 11 not to eliminate the plug of the third opening part during the washing operation.

After the washing, when the resin molded article of the plug 11 plugging the third opening part 18 is degraded, the inside and the outside of the tubular main body 14 can be communicated through the third opening part 18. This allows a fluid to circulate between the inside and the outside of the downhole tool 1 through the third opening part 18.

Next, the treatment of stimulating a subterranean formation will be described. The treatment of stimulating a subterranean formation is preferably performed after washing the well, from the viewpoint of increasing recovery efficiency of hydrocarbon resources recovered from a subterranean formation. When a subterranean formation is stimulated, the fluid can preferably circulate between the inside and the outside of the downhole tool 1 through the third opening part.

The procedure for stimulating a subterranean formation is as follows. First, a stimulation fluid to stimulate a subterranean formation is injected from the ground to the tubular main body 14 through the first opening part 16. The injected stimulation fluid is discharged to the well wall 20 through the third opening part 18, and the subterranean formation is stimulated. This stimulation increases the amount of hydrocarbon resources to be recovered from the subterranean formation, and thus this can contribute to increasing production efficiency.

After the treatment of stimulating the subterranean formation, the produced fluid containing hydrocarbon resources flowing from the subterranean formation into the well can be recovered to the ground through the third opening part 18 and the first opening part 16.

The present embodiments provides a plug that has a capability to maintain the isolation function in a plurality of areas of the downhole tool in the well in a high-temperature environment for a desired period of time, and that suitably degrades also in a low salt concentration fluid or water after a lapse of the desired period of time. This further ensures the isolation for the desired period of time and further can reduce a risk of clogging at the isolation position and the like.

Case of Second Aspect

An example of a more specific method of the well treatment using the plug of the second aspect will be described for a method in a case of performing fracturing using the downhole plug illustrated in FIG. 4 and FIG. 5. This is a well treatment method in a case where a downhole plug corresponding to the plug of the second aspect temporarily isolates a well. FIG. 4 is a schematic view of a cross section of a downhole plug according to an embodiment of the present invention when the downhole plug is at a predetermined position in a well. FIG. 5 is a schematic view of a cross section of the downhole plug when the downhole plug isolates the well. In FIG. 4 and FIG. 5, only one of cross sections of the downhole plug that are symmetrical with respect to the axis is illustrated.

First, the downhole plug 5 is introduced from the ground to any position in the well using a fluid or the like. Subsequently, a setting tool is then operated and the center element 52 is deformed as illustrated in FIG. 5, thereby installing and fixing the downhole plug 5 on the well wall 20.

The leading edge of the mandrel 51 of the downhole plug 5 is then closed, and the isolation is completed. Examples of the method of isolation include a method including arranging the ball 53 at the leading edge of the mandrel 51, the ball 53 having been supplied toward the leading edge of the downhole plug 5, to close one end of the mandrel 51, for example, as illustrated in FIG. 5. This allows the downhole plug 5 acting as the boundary to separate the space between the inlet side and the back side of the well. The ball 53 may be arranged at the leading edge of the mandrel 51 by pumping it together with a fluid from the ground.

Then, water or a fluid containing water is injected from the ground, and high pressure is applied to the space of the well, the space being on the inlet side relative to the downhole plug 5, to expand and propagate fracture in the well. Such a method of expanding fracturing by injection of a fluid is referred to as hydraulic fracturing.

After completion of the fracturing, the resin molded article constituting a part or whole of the downhole plug 5 is degraded by bringing the fluid containing water into contact with the downhole plug 5. As a result, the downhole plug 5 loses its original shape, and the isolation of the well is eliminated.

The plug according to the present embodiments can maintain the isolation function in a plurality of areas of the well in a high-temperature environment for a desired period of time and can suitably degrades also in a low salt concentration fluid or water after a lapse of the desired period of time. This can perform the isolation more reliably for the desired period of time and further can reduce a risk of clogging at the isolation position and the like.

[Summary of Downhole Tool]

The downhole tool or a component thereof according to the third embodiment of the present invention includes a resin molded article formed by molding using the resin composition according to the first embodiment or the second embodiment as a raw material. Furthermore, the plug according to the fourth embodiment of the present invention is a plug for temporarily preventing circulation of a fluid in a well, and is the above-mentioned downhole tool or a component thereof according to the above-mentioned third embodiment. Since the downhole tool or a component thereof or the plug according to an embodiment of the present invention includes, in the main part thereof, a resin molded article made of the above-mentioned resin composition as a material, it is possible to suppress a decrease in the thickness of the downhole tool or a component thereof in a well at a high temperature.

The plug according to the fifth embodiment of the present invention may be a ball, a dart, a disc, a screw or a packer in the fourth embodiment described above.

The plug according to the sixth embodiment of the present invention may be, in the fourth embodiment described above, used for closing an opening part provided in a circumferential surface of a tubular component, the opening part communicating between an inside and an outside of the tubular component, the resin molded article portion includes a first surface and a second surface, the first surface being exposed to the outside of the tubular component at the time of use and the second surface being exposed to the inside of the tubular component at the time of use, and the shortest distance between the first surface and the second surface is 6 mm or more and 65 mm or less.

For the plug according to the seventh embodiment of the present invention, in any one of the above-mentioned fourth to sixth embodiments, at least a part of the above resin molded article portion may be covered with an other molded article made of a non-degradable material.

For the plug according to the eighth embodiment of the present invention, in the above-mentioned seventh embodiment, the other molded article is an annular molded article having an outer circumferential surface formed by a screw thread, and the resin molded article portion may be disposed inside the ring of the annular molded article.

The plug of the ninth embodiment of the present invention may be a frack plug or a bridge plug in the above-mentioned fourth embodiment.

The downhole tool according to the tenth embodiment of the present invention may include a tubular component and the plug according to any one of the fourth to eighth embodiments, wherein the tubular component has an opening part in a circumferential surface of the tubular component, the opening part communicating between an inside and an outside of the tubular component, and the plug is engaged with the tubular component in a way that closes the opening part.

Any of the downhole tool or a component thereof includes a resin molded article made of the above-mentioned resin composition as a material in the main part. Therefore, in the case of being used in a well at a high temperature in each form and application specified as described above, it is more effective from the viewpoint of suppressing a decrease in the thickness.

The well treatment method according to the eleventh embodiment of the present invention may include: temporarily isolating one or more areas of at least one of a well or a downhole tool using the plug according to any one of the fourth to ninth embodiments; and eliminating the temporary isolation with the plug by degrading the resin molded article portion of the plug and changing a flow path of a fluid in the one or more areas.

Alternatively, the well treatment method according to the twelfth embodiment of the present invention may include: preventing a flow of a fluid in a well by installing the plug according to any one of the fourth to ninth embodiments in the well; and degrading the resin molded article and restoring the flow of the fluid.

Alternatively, the well treatment method according to the thirteenth embodiment of the present invention may include: (1) introducing a downhole tool into a well, the downhole tool including a first opening part at a one edge, a second opening part at the other edge, and a third opening part between the one edge and the other edge, the third opening part isolated by the plug as a downhole component of any of the fourth to eighth embodiments described above: (2) injecting a fluid from the ground into the downhole tool through the first opening part and washing the well by discharging the fluid from the second opening part into the well; and (3) degrading the resin molded article portion of the plug after the washing and enabling circulation of a fluid between the inside and the outside of the downhole tool through the third opening part.

In any of the well treatment methods, a downhole tool or a component thereof including a resin molded article made of the above-mentioned resin composition as a material in the main part is used. Therefore, in each application specified as described above, it is possible to suppress a decrease in the thickness of the downhole tool or a component thereof in a well at a high temperature.

The present invention is not limited to each embodiment described above, and may be variously altered within the scope indicated in the claims. Embodiments obtained by appropriately combining technical means disclosed in different embodiments are also included in the technical scope of the present invention.

Note that, according to an embodiment of the present invention described above, in the recovery of underground resources by a downhole, it is possible to reliably use a device and a component utilized for the recovery in a desired application even under an environment at a high temperature. Furthermore, according to the above-described embodiment of the present invention, the environmental damage due to the release of the degradation product into the downhole after the utilization is reduced. Accordingly, according to the above-mentioned embodiments of the present invention, contribution to the achievement of the sustainable development target (SDGs) that protects the richness of the land or sea is expected.

EXAMPLES

Example 1

Polyglycolic acid (PGA, "Kuredux 100R 90" available from KUREHA CORPORATION, weight-average molecular weight (Mw): 210000), polybutylene terephthalate (PBT, "NOVADURAN (trade name) 501CR5' available from Mitsubishi Engineering-Plastics Corporation), polyethylene 5 terephthalate (PET, "RY518X" available from Toyobo Co., Ltd.), and a cyclic carbodiimide (cyc-CDI, "Carbosista (trade name)" available from Teijin Ltd., grade "TCC-NP") were prepared.

70 parts by mass of PGA, 30 parts by mass of PBT and 5 parts by mass of cyc-CDI were mixed. The obtained mixture was supplied to a feed part of a twin-screw extrusion kneader set at a screw section temperature of from 210 to 250° C. and melt-kneaded to make a pellet-formed resin composition 1.

The resin composition 1 was put into an injection molding machine in which the temperature of the screw part was set to from 210 to 255° C., and injection molding was performed under the condition of a mold temperature of 100° C. to make a resin molded article 1A having a cubic shape with a side width of 12.5 mm. Furthermore, under the same condition, a resin molded article 1B, which is a dumbbell-shaped tensile test piece (1A test piece), was made.

Examples 2 and 3

A pellet-formed resin composition 2 was made in the same manner as in Example 1 except that the amount of cyc-CDI was changed to 3 parts by mass, and a cubic resin molded article 2A and a dumbbell-shaped resin molded article 2B were made.

Furthermore, a pellet-formed resin composition 3 was made in the same manner as in Example 1 except that the amount of cyc-CDI was changed to 10 parts by mass, and a cubic resin molded article 3A and a dumbbell-shaped resin molded article 3B were made.

Examples 4 to 6

A pellet-formed resin composition 4 was made in the same manner as in Example 1 except that the amount of PGA was changed to 55 parts by mass and the amount of PBT was changed to 45 parts by mass, and a cubic resin molded article 4A and a dumbbell-shaped resin molded article 4B were made.

Furthermore, a pellet-formed resin composition 5 was made in the same manner as in Example 1 except that the amount of PGA was changed to 95 parts by mass and the amount of PBT was changed to 5 parts by mass, and a cubic resin molded article 5A and a dumbbell-shaped resin molded article 5B were made.

Moreover, a pellet-formed resin composition 6 was made in the same manner as in Example 1 except that the amount of PGA was changed to 65 parts by mass and the amount of PBT was changed to 15 parts by mass, and a cubic resin molded article 6A and a dumbbell-shaped resin molded article 6B were made.

Comparative Example 1

In the same manner as in Example 1 except that the amount of cyc-CDI was changed to 1 part by mass, a pellet-formed resin composition C1 was made, and a cubic resin molded article C1A and a dumbbell-shaped resin molded article C1B were made.

Comparative Examples 2 and 3

In the same manner as in Example 1 except that a polyethylene terephthalate (PET, "RY518X" available from Toyobo Co., Ltd.) was used instead of PBT, a pellet-formed resin composition C2 was made, and a cubic resin molded article C2A and a dumbbell-shaped resin molded article C2B were made.

Furthermore, in the same manner as in Example 1 except that a polylactic acid (PLA, "4032D" available from Natureworks) was used instead of PBT, a pellet-formed resin composition C3 was made, and a cubic resin molded article C3A and a dumbbell-shaped resin molded article C3B were made.

Comparative Example 4

In the same manner as in Example 1 except that 100 parts by mass of PGA was used instead of 70 parts by mass of PGA, 30 parts by mass of PBT, and 5 parts by mass of the cyc-CDI, a pellet-formed resin composition C4 was made, and a cubic resin molded article C4A and a dumbbell-shaped resin molded article C48 were made.

Comparative Examples 5 and 6

In the same manner as in Example 1 except that 100 parts by mass of PGA and 3 parts by mass of the cyc-CDI were used instead of 70 parts by mass of PGA, 30 parts by mass of PBT and 5 parts by mass of the cyc-CDI, a pellet-formed resin composition C5 was made, and a cubic resin molded article C5A and a dumbbell-shaped resin molded article C58 were made.

Furthermore, in the same manner as in Example 1 except that 100 parts by mass of PGA, and 20 parts by mass of the cyc-CDI were used instead of 70 parts by mass of PGA, 30 parts by mass of PBT and 5 parts by mass of the cyc-CDI, a pellet-formed resin composition C6 was made, and a cubic resin molded article C6A and a dumbbell-shaped resin molded article C68 were made.

Comparative Example 7

In the same manner as in Example 1 except that the cyc-CDI was not used, a pellet-formed resin composition C7 was made, and a cubic resin molded article C7A and a dumbbell-shaped resin molded article C7B were made.

Evaluation

[1] Degradability test

Using the cubic resin molded article A, a degradability test was performed according to the following (1) to (5), and the thickness reduction rate was calculated.

(1) The cubic resin molded article A was annealed at 120° C. for 5 hours, and then the length, width, and height of the resin molded article A were measured.

(2) In a 50-mL vial, 50 mL of deionized water was charged, and the vial was allowed to stand in a thermostatic vessel at 80° C. to keep water at 80° C. in advance.

(3) The resin molded article A was placed into the vial prepared in (2) and immersed in 50 mL of 80° C. deionized water. After that, the vial was then allowed to stand in a thermostatic vessel at 80° C., and the resin molded article was taken out after a lapse of a predetermined period of time.

(4) After the resin molded article A taken out was allowed to stand in an oven at 80° C. in the atmospheric pressure for 2 hours and dried, a brittle layer of the resin molded article A was scraped off, and the length, width, and height of the remaining part were measured. The brittle layer was removed by scraping off using a cutter.

(5) The acquired data were plotted to create a graph with the horizontal axis for time (hr) and the vertical axis for the decrement of thickness, and the slope of the straight line calculated by the least squares method was determined. The obtained slope of the straight line is the thickness reduction rate (μm/hr). Here, the decrement of thickness is an average of the differences in the length, width, and height of the resin molded article A between before and after the immersion. A plot with a decrement of thickness of 0.01 mm or less might have included a dimensional measurement error and thus was excluded from the calculation.

[2] Tensile Test

To measure a stress at the tensile maximum point of the resin molded article produced, a tensile test was performed. The tensile test was measured by using the resin molded article B (a tensile test piece of type 1A) and subjecting the tensile test piece to tensile stress at a rate of 50 mm/min in an environment of 23° C. in accordance with ISO527.

The compositions and evaluation results of the resin compositions 1 to 6 are presented in Table 1 below. Furthermore, the compositions and evaluation results of the resin compositions C1 to C7 are presented in the following Table 1. In the table, "$R_{80}$" represents the thickness reduction rate (μm/hr) at in 80° C. water, and "S" represents the stress (MPa) at the maximum tensile point.

[Table 1]

TABLE 1

| | | Example 1 | Example 2 | Example 3 | Example 4 | Example 5 | Example 6 |
|---|---|---|---|---|---|---|---|
| Composition | PGA | 70 | 70 | 70 | 55 | 95 | 85 |
| (parts by | PBT | 30 | 30 | 30 | 45 | 5 | 15 |
| mass) | PET | — | — | — | — | — | — |
| | PLA | — | — | — | — | — | — |
| | Cyc-CDI | 5 | 3 | 10 | 5 | 5 | 5 |
| $R_{80}$ (μm/hr) | | 27.6 | 45.1 | 21.5 | 20.9 | 48 | 52.3 |
| S (MPa) | | 93.5 | 89.6 | 92.5 | 88 | 109 | 103 |

TABLE 2

| | | Comparative Example 1 | Comparative Example 2 | Comparative Example 3 | Comparative Example 4 | Comparative Example 5 | Comparative Example 6 | Comparative Example 7 |
|---|---|---|---|---|---|---|---|---|
| Composition | PGA | 70 | 70 | 70 | 100 | 100 | 100 | 70 |
| (parts by | PBT | 30 | — | — | — | — | — | 30 |
| mass) | PET | — | 30 | — | — | — | — | — |
| | PLA | — | — | 30 | — | — | — | — |
| | Cyc-CDI | 1 | 5 | 5 | — | 3 | 20 | — |
| $R_{80}$ (μm/hr) | | 80.8 | 61.7 | 66.0 | 64.2 | 60.2 | 36.9 | 84.2 |
| S (MPa) | | 111 | 94.9 | 98.3 | 101 | — | 112 | 92.9 |

[Observation of Microscopic Structure of Resin Molded Article]

[Preparation of Resin Molded Article]

For the purpose of observing the dispersion state of the resin in the resin molded articles, the following resin molded articles were made under the above-mentioned conditions.

Resin molded article A having a mass ratio of PGA PBT of 90:10

Resin molded article B having a mass ratio of PGA:PBT of 70:30 (Comparative Example 7)

Resin molded article C having a mass ratio of PGA:PBT:cyc-CDI of 70:30:5 (Example 1)

Resin molded article D having a mass ratio of PGA:PET of 70:30

Resin molded article E having a mass ratio of PGA:PET:cyc-CDI of 70:30:5 (Comparative Example 2)

[Observation Position]

The observation position of the microscopic structure of the resin molded article is indicated in FIG. 6. First, a melt-kneaded product of the resin composition was injected from the gate G in the injection direction Di to make a rod-shaped resin molded article. The resin molded article was cut at a position at the 40 mm from the tip in the injection direction Di of the resin molded article to form the cross section So perpendicular to the injection direction Di. The cross section So was observed with a scanning electron microscope (SEM).

[Observation Results]

FIG. 7 presents an SEM photograph of a cross-section of the resin molded article A having a mass ratio of PGA:PBT of 90:10. In the resin molded article A, the PBT phase is dispersed in the PGA phase. The size of the PBT phase is mostly 500 nm or less, and at most 1 μm or less. Thus, in the resin molded article A, PBT is well-dispersed in PGA.

FIG. 8 presents a SEM photograph of a cross section of the resin molded article B (Comparative Example 7) in which the mass ratio of PGA:PBT is 70:30. In the resin molded article B, the PBT phases are dispersed in the PGA phase, but the size of the PBT phase is larger than that of the resin composition A, and larger particles of 2 to 5 μm have increased. Furthermore, approximately circular PBT phases are abundant. Moreover, the size of the PBT phase tends to be larger at the center part of the cross section and smaller at the edges. Thus, in the resin molded article B, the dispersibility of the PBT phases is low. This is presumed to be due to poor cutting of the PBT phases in the molding process.

FIG. 9 presents a SEM photograph of a cross section of the resin molded article C (Example 1) in which the mass ratio of PGA:PBT:cyc-CDI is 70:30:5. In the resin composition C, the dispersion failure of the PBT phases in the PGA phase is more remarkable. A banded distribution of the PBT phases is seen, with the banded PTB phase being oriented in the injection direction. This is presumed to be due to poor cutting of the PBT phases in the molding process, and further presumed to be due to further elongation of PBT caused by the reaction with the cyc-CDI, and as a result, the above-mentioned poor cutting was promoted.

FIG. 10 presents a SEM photograph of a cross section of the resin molded article D (Comparative Example 7) in which the mass ratio of PGA:PET is 70:30. In the resin molded article D, the PET phases are dispersed in the PGA phase. Most of the PET phases have a size of from 1 to 5 μm. Furthermore, there are many approximately circular PET phases. Thus, in the resin molded article D, PET was well dispersed in PGA, FIG. 11 presents a SEM photograph of a cross section of the resin molded article E (Comparative Example 2) in which the mass ratio of PGA:PET:cyc-CDI is 70:30:5. In the resin composition E, the PET phases are finely dispersed in the PGA phase. The sizes of many PET phases are 2 μm or less, which is smaller than that of the resin composition D. Also, many PET phases have an approximately circular shape.

DISCUSSION

In any of the resin molded articles of Examples 1 to 6, the thickness reduction rate in 30° C. water was lower than that of a resin molded article not containing PBT, for example, the resin molded article C4, which is composed only of PGA (Comparative Example 4), This is considered to be because the contact of water with the PGA phase in the resin molded article was suppressed mainly for two reasons.

The first reason is that the PBT phases exhibit a barrier function against the penetration of water into the resin molded article. That is, the PBT phases in the resin composition are initially finely dispersed in the PGA phase, and in the molding process, PBT is bonded to each other via the cyclic carbodiimide compound, and the molecular chain of PBT becomes longer. As a result, the melt viscosity of PBT becomes sufficiently higher than the melt viscosity of the PGA, and the melt miscibility between PGA and PBT is reduced. Then, the PBT phases become larger and are distributed in the PGA phase in the form of stripes or meshes. Therefore, it is considered that when a resin molded article is formed, the PBT phases distributed more coarsely than at the beginning of kneading prevent water from penetrating into the resin molded article and suppresses contact of water with the PGA phases, and as a result, the effect of delaying degradation of 80° C. water is exhibited.

The second reason is that the unreacted cyc-CDI reacts with water penetrating into the resin molded article. That is, it is considered that the less the amount of PBT is, the more the unreacted cyc-CDI remains. It is considered that this unreacted cyc-CDI consumes the water that has penetrated into the resin molded article, and thus the contact between PGA and water is suppressed and the decrease in thickness is delayed.

This is inferred from, for example, a comparison between Example 5 and Example 6, or a comparison between Comparative Example 4 and Comparative Example 5 or Comparative Example 6. That is, in the case of 5 parts by mass of PBT (Example 5), the amount of the carbodiimide consumed by the reaction with COOH is smaller than that in the case of 15 parts by mass of PBT (Example 6), and thus a larger amount of unreacted carbodiimide remains in the resin molded article. It is considered that such a difference causes a difference in thickness reduction rate between Example 5 and Example 6.

The thickness reduction rate Rao in either of Examples 5 and 6 is smaller than that in Comparative Example 4 which does not contain PBT and cyc-CDI. Therefore, it is considered that, until the amount of PBT reaches at least 15 parts by mass (15 mass % with respect to the total amount of the resin components), the effect of further reducing the thickness reduction rate Rao is more greatly affected by the presence of a larger amount of the unreacted cyc-CDI in the resin molded article than by the dispersion of the PBT phase in the PGA phase in the resin molded article.

Here, it is considered that the distance between the PBT phases in the resin molded article is minimized when the PBT content is in the range of from 10 to 15%. First, from the comparison between the SEM photograph (FIG. 7) of the resin molded article A of 10 parts by mass of PBT not containing cyc-CDI and the SEM photograph (FIG. 8) of the resin molded article B of 30 parts by mass of PBT not containing cyc-CDI, the distance between the PBT phases in the resin molded article A is shorter than that in the resin molded article B. When these thickness reduction rates $R_{80}$ in 80° C. water are measured, the thickness reduction rate $R_{80}$ of the resin molded article A is higher than the thickness reduction rate $R_{80}$ of the resin molded article B.

On the other hand, the thickness reduction rates $R_{80}$ of the resin molded articles with 100 parts by mass of PGA and 5 parts by mass of the cyc-CDI are numerical values between Comparative Examples 5 and 6 (actually more than 40 μm/hr). According to the comparison between the thickness reduction rate $R_{80}$ in this case and the $R_{80}$ in Example 5, the $R_{80}$ in Example 6 and the $R_{80}$ in Example 1, it is considered that the thickness reduction rate $R_{80}$ becomes highest when the amount of PBT is around 15 mass % of the resin component, and thereafter, $R_{80}$ decreases as the amount of PBT increases. Therefore, it is considered that when the amount of PBT is an amount up to about 15 mass % in the resin component, even if cyc-CDI is contained, the PBT phases are finely dispersed without being aggregated.

Next, the relationship between the amount of the cyc-CDI and the thickness reduction rate will be examined. From Comparative Examples 4 to 6 and the above-mentioned description, the $R_{80}$ of the resin molded article of PGA and cyc-CDI decreases from 64.2 μm/hr to a slightly over 40 μm/hr as the amount of the cyc-CDI increases, and then remains substantially constant until the amount of the cyc-CDI reaches 20 parts by mass.

On the other hand, from Comparative Examples 7 and 1 and Examples 1 to 3, the $R_{80}$ of the resin molded article in which PGA/PBT is 70/30 in parts by mass is higher than that of the resin molded article of PGA and cyc-CDI when the amount of the cyc-CDI is up to 1 part by mass (Comparative Examples 7 and 1), but is lower than that of the resin molded article of PGA and cyc-CDI when the amount of the cyc-CDI is more than 3 parts by mass (Examples 1 to 3). Since the $R_{80}$ of Comparative Example 2 (PGA/PET/cyc-CDI is 70/30/5) is 61.7 μm/hr, and the $R_{80}$ of Comparative Example 3 (PGA/PLA/cyc-CDI is 70/30/5) is 66.0 μm/hr, it is considered that the fact that $R_{80}$ becomes lower than the $R_{80}$ of the resin molded article of PGA and cyc-CDI at least in an amount of 3 mass % or more in the resin component is an effect specific to the resin molded article containing PBT

INDUSTRIAL APPLICABILITY

The present invention can be utilized in a resin material that can be degraded by hydrolysis in water while being capable of suppressing degradation in water at a high temperature, and in various technical fields using said resin material in such a situation.

REFERENCE SIGNS LIST

1, 2, 3: Downhole tool

5: Downhole plug

11, 21, 31: Plug
14, 24, 34: Tubular main body
16: First opening part
17: Second opening part
18, 28, 38: Third opening part
20: Well wall
22: Main body part
23: Annular molded article
51: Mandrel
52: Center element
53: Ball
54: Socket
55, 55*a*, 55*b*: Cone
56, 56*a*, 56*b*: Slip
57, 57*a*, 57*b*: Equalizer ring
58: Load ring
59: Bottom
121: First surface
122: Second surface

The invention claimed is:

1. A downhole tool or a component thereof, comprising a resin molded article formed by molding a resin composition as a raw material, the resin composition comprising:

50 parts by mass or more and 97 parts by mass or less of polyglycolic acid;

3 parts by mass or more and 50 parts by mass or less of polybutylene terephthalate; and 2 parts by mass or more and 15 parts by mass or less of a cyclic carbodiimide compound with respect to 100 parts by mass of a total amount of the polyglycolic acid and the polybutylene terephthalate, wherein a thickness reduction rate of the resin molded article in 80° C. water is less than 60 μm/hr.

2. The downhole tool or component thereof according to claim 1, wherein a content of the cyclic carbodiimide compound in the resin composition is 4 parts by mass or more with respect to 100 parts by mass of a total amount of the polyglycolic acid and the polybutylene terephthalate.

3. A plug for temporarily preventing circulation of a fluid in a well, the plug being the downhole tool or a component thereof according to claim 1.

4. The plug according to claim 3, which is a ball, a dart, a disk, a screw or a packer.

5. The plug according to claim 3, wherein the plug is to be used for closing an opening part provided in a circumferential surface of a tubular component, the opening part communicating between an inside and an outside of the tubular component, the resin molded article portion comprises a first surface and a second surface, the first surface being exposed to the outside of the tubular component at a time of use, and the second surface being exposed to the inside of the tubular component at the time of use, and a shortest distance between the first surface and the second surface is 6 mm or more and 65 mm or less.

6. The plug according to claim 3, wherein the resin molded article portion is at least partially covered with another molded article comprising a non-degradable material.

7. The plug according to claim 6, wherein said another molded article is an annular molded article comprising an outer circumferential surface formed by a screw thread, and the resin molded article portion is disposed inside a ring of the annular molded article.

8. The plug according to claim 3, which is a frac plug or a bridge plug.

9. A downhole tool comprising a tubular component, and the plug according to claim 3, wherein the tubular component comprises an opening part in a circumferential surface of the tubular component, the opening part communicating between an inside and an outside of the tubular component, and the plug is engaged with the tubular component in a way that closes the opening part.

10. A well treatment method comprising:

temporarily isolating one or more areas of at least one of a well or a downhole tool by using the plug according to claim 3; and eliminating the temporary isolation with the plug by degrading the resin molded article portion of the plug and changing a flow path of a fluid in the one or more areas.

11. A well treatment method comprising:

preventing a flow of a fluid in a well by installing the plug according to claim 3, in the well; and degrading the resin molded article and restoring the flow of the fluid.

12. A well treatment method comprising:

introducing a downhole tool into a well, the downhole tool comprising a first opening part at one edge, a second opening part at the other edge, and a third opening part between the one edge and the other edge, the third opening part isolated by the plug according to claim 3 as a downhole tool component;

injecting a fluid from a ground into the downhole tool through the first opening part and washing the well by discharging the fluid from the second opening part into the well; and degrading the resin molded article portion of the plug after the washing and enabling circulation of a fluid between an inside and an outside of the downhole tool through the third opening part.

* * * * *